UNITED STATES PATENT OFFICE 2,467,621

DISAZO DYES

Otto Kaiser, Dornach, and Ernst Reich, Neue Welt, near Basel, Switzerland, assignors to Ciba Limited, a Swiss firm No Drawing. Application February 8, 1946, Serial No. 646,499. In Switzerland February 20, 1945

6 Claims. (Cl. 260—153)

According to this invention valuable new dyestuffs suitable for dyeing cellulose are made by coupling a diazotized ortho-aminophenol of the general formula

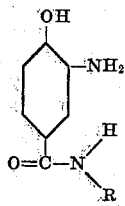

in which R represents an aryl radical, and in which any nuclear hydrogen atom may be replaced by a substituent, for example, a halogen atom or a nitro group, with N-substitution products of 2-amino-5-hydroxynaphthalene-7-sulfonic acid.

The dyestuffs so obtained which correspond in their free state to the general formula

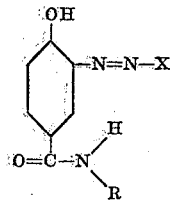

wherein R has the above mentioned meaning, and X represents the radical of an N-substitution product of 2-amino-5-hydroxynaphthalene-7-sulfonic acid, can be converted on the fiber into complex metal compounds, especially complex copper compounds, whereby the properties of fastness of the dyestuffs are considerably improved.

As compared with the dyestuffs of the French Patent of addition No. 22,841 (addition to French Patent No. 481,190), the new dyestuffs have a considerably better affinity for cellulose fibers.

The ortho-amino-phenol carboxylic acid amides used for making the new dyestuffs can be obtained in known manner by the reaction of a 1-hydroxy-2-nitrobenzene-4-carboxylic acid with an amine in the presence of an agent capable of removing water, followed by reduction of the resulting amide.

As 1-hydroxy-2-nitrobenzene-carboxylic acids there come into consideration, for example, 1-hydroxy-2-nitrobenzene-4-carboxylic acid, 1-hydroxy-2-nitro-6-chlorobenzene-4-carboxylic acid, 1-hydroxy-2-nitro-6-bromobenzene-4-carboxylic acid or the like.

For reaction with these acids or their chlorides there may be used, among others, the following amines:

1-aminobenzene, 2-chloro-1-aminobenzene, 2-methoxy-1-aminobenzene, 4-ethoxy-1-aminobenzene, 4-methyl-1-aminobenzene, 1-aminonaphthalene, 2 aminonaphthalene, and the like.

As coupling components there come primarily into consideration:

Derivatives of 2-amino-5-hydroxynaphthalene-7-sulfonic acid, for example N-acyl derivatives, such as 2-acetylamino-, 2-carboxyethylamino-, 2-benzoylamino-, 2-(2':4'-dichlor)-benzoylamino-, 2-(4'-methoxy)-benzoylamino-5-hydroxynaphthalene-7-sulfonic acid, and the symmetrical urea of 2-amino-5-hydroxy-naphthalene-7-sulfonic acid, furthermore unsymmetrical ureas of 2-amino-5-hydroxynaphthalene-7-sulfonic acid, which may contain azo-groups, as for instance the unsymmetrical urea, which is obtained by the reaction of phosgene on one molecular proportion of 2-amino-5-hydroxynaphthalene-7-sulfonic acid and one molecular proportion of 4-amino-4'-hydroxy-1:1'-azobenzene-3'-carboxylic acid. Further must be mentioned N-alkyl- or N-aryl-derivatives of 2-amino-5-hydroxynaphthalene-7-sulfonic acid such as 2-ethylamino-5-hydroxynaphthalene-7-sulfonic acid, 2-β-hydroxyethylamino-5-hydroxynaphthalene-7-sulfonic acid, 2-phenylamino-5-hydroxynaphthalene-7-sulfonic acid and derivatives thereof substituted in the phenyl nucleus, such as 2-(4'-methoxy)-, 2-(4'-chlor)-, 2-(4'-carboxy)-, 2-(3'-carboxy)-, 2-(4'-hydroxy-3'-carboxy)-, 2-(4'-sulfo)- or 2-(4'-methoxy)-phenylamino-5-hydroxynaphthalene-7-sulfonic acid, 5:5'-dihydroxy-2:2'-dinaphthylamine-7:7'-disulfonic acid; and also, preferably, reaction products of heterocyclic compounds containing reactive halogen atoms, with 2-amino-5-hydroxynaphthalene-7-sulfonic acid, such as the secondary condensation product from 1 molecular proportion of 2-amino-5-hydroxynaphthalene-7-sulfonic acid, 1 molecular proportion of cyanuric chloride and 1 molecular proportion of 1-aminobenzene; the secondary condensation product from 2 molecular proportions of 2-amino-5-hydroxynaphthalene-7-sulfonic acid and 1 molecular proportion of cyanuric chloride; the secondary condensation product from 1 molecular proportion of 2-amino-5-hydroxynaphthalene-7-sulfonic acid, 1 molecular proportion of 2-amino-8-hydroxynaphthalene-6-sulfonic acid and 1 molecular proportion of cyanuric chloride; the ternary condensation product from 2 molecular proportions of 2-amino-5-hydroxynaphthalene-7-sulfonic acid, 1 molecular proportion of 1-aminobenzene and 1 molecular proportion of cyanuric chloride; and the ternary condensation product from 1 molecular proportion of 2-amino-5-hydroxynaphthalene-7-sulfonic acid, 1 molecular proportion of 1-amino-4-hydroxybenzene-3-carboxylic acid or 1 molecular proportion of 4-amino-4'-hydroxy-1:1'-azobenzene-3'-carboxylic acid, 1 molecular proportion of 1-aminobenzene and 1 molecular proportion of cyanuric chloride, and the like.

The dyestuffs obtained with the foregoing components may be converted on the fiber, after dyeing, into complex copper compounds by methods in themselves known, the treatment with an agent yielding copper being carried out in the dyebath or in a separate bath. Thus, there come into consideration, for example after-coppering with copper sulfate, in the heat, after-coppering with copper salts in the presence of water-soluble condensation products from formaldehyde and compounds like melamine or dicyandiamidine or coppering in the exhausted dyebath with complex compounds of copper salts and aliphatic hydroxycarboxylic acids like tartaric acid.

The new dyestuffs have in general a good affinity for cellulose fibers, and yield dyeings which are distinguished by good wet fastness properties and a good fastness to light.

The invention is illustrated in the following examples, which could be modified by the substitution of any of the components named in the opening part of this specification, and which give more detailed information regarding the manufacture, properties and use of the new dyestuffs. The parts are by weight.

*Example 1*

22.8 parts of 1-hydroxy-2-aminobenzene-4-carboxylic acid phenylamide are diazotized at 0° C. with the addition of 6.9 parts of sodium nitrite and 27 parts of concentrated hydrochloric acid. The diazo-compound is coupled with 36.8 parts of the ternary condensation product from 1 molecular proportion of cyanuric chloride, 2 molecular proportions of 2-amino-5-hydroxynaphthalene-7-sulfonic acid and 1 molecular proportion of aminobenzene, the said condensation product having been dissolved in the form of its sodium salt in 1000 parts of water with the addition of 100 parts of calcium hydroxide of 20 per cent. strength. After 4 hours the dyestuff so obtained is precipitated by means of hydrochloric acid and separated by filtration. The filter residue is brought into solution in the form of its sodium salt. The dyestuff which in the free state corresponds to the formula

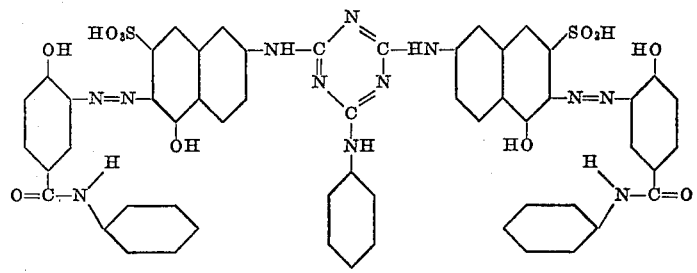

is separated from the solution by means of sodium chloride, separated by filtration and dried. It is a black powder which dyes cotton red tints from a weakly alkaline bath. By adding to the dyebath a copper salt solution made from copper sulfate and sodium tartrate the tint acquires a more ruby red shade. The dyeing is fast to washing and light.

Similar dyestuffs are obtained if the 2 molecular proportions of 1-hydroxy-2-aminobenzene-4-carboxylic acid phenylamide used per 1 molecular proportion of coupling component in this example, are replaced by 2 molecular proportions of 1-hydroxy-2-aminobenzene-4-carboxylic acid-(1'-naphthyl)-amide or by 1 molecular proportion of 1-hydroxy-2-aminobenzene-4-carboxylic acid-(4'-tolyl)-amide and 1 molecular proportion of 1-hydroxy-2-aminobenzene-4-carboxylic acid-(2'-chlorophenyl)-amide.

The replacement of the triazine derivative used as coupling component by the symmetrical urea derivatives of 2-amino-5-hydroxynaphthalene-7-sulfonic acid leads to similar dyestuffs.

Finally, replacing, in this example, the ternary triazine condensation product used as coupling component by the secondary condensation product from 1 molecular proportion of cyanuric chloride and 2 molecular proportions of 2-amino-5-hydroxynaphthalene-7-sulfonic acid, the other prescriptions of this example remaining the same, a dyestuff is obtained whose dyeings, when coppered on the fiber, are also ruby red.

A modification of the prescriptions of this example consisting in the use, in this case, of a mixture of 11.4 parts of 1-hydroxy-2-aminobenzene-4-carboxylic acid phenyl-amide and 13.1 parts of 1-hydroxy-2-aminobenzene-4-carboxylic acid-(2'-chlorophenyl)-amide instead of 22.8 parts of 1-hydroxy-2-aminobenzene-4-carboxylic acid phenylamide, results in a dyestuff with very similar properties.

*Example 2*

22.8 parts of 1-hydroxy-2-aminobenzene-4-carboxylic acid phenylamide are diazotized with the addition of 6.9 parts of sodium nitrite and 27 parts of concentrated hydrochloric acid at 0° C. The diazo-compound is coupled with 23 parts of 5:5'-dihydroxy-2:2'-dinaphthylamine-7:7'-disulfonic acid, which has been dissolved in the form of its sodium salt in 1000 parts of water with the addition of 100 parts of calcium hydroxide of 20 per cent. strength. After 4 hours the dyestuff so obtained which in the free state corresponds to the formula:

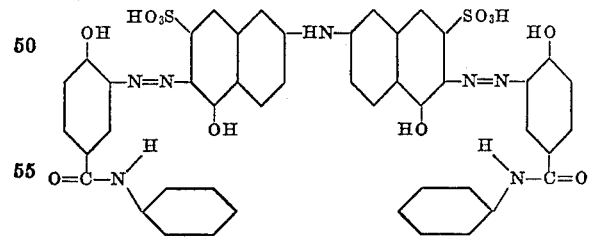

is precipitated by the addition of hydrochloric acid, and separated by filtration. The filter residue is brought into solution in the form of its sodium salt, precipitated by means of sodium chloride, separated by filtration and dried.

The new dyestuff of the above formula is a dark powder which dyes cotton violet tints. By after-treatment with water-soluble agents yielding copper, bluish violet tints of good fastness to water and light are obtained.

If in this example, the 23 parts of 5:5'-dihydroxy-2:2'-dinaphthylamine-7:7'-disulfonic acid are replaced by 31.5 parts of 2-phenylamino-5-hydroxynaphthalene-7-sulfonic acid, the other prescriptions of this example remaining the same, a dyestuff is obtained which dyes cotton in red violet tints, the fastness properties of which can be improved by after-coppering.

*Example 3*

22.8 parts of 1-hydroxy-2-aminobenzene-4-carboxylic acid-phenylamide are diazotized at 0° C. with the addition of 6.9 parts of sodium nitrite and 24 parts of concentrated hydrochloric acid and the diazo compound is combined with 36.8 parts of the ternary triazine condensation product from 1 molecular proportion of cyanuric chloride, 1 molecular proportion of 2-amino-5-hydroxynaphthalene-7-sulfonic acid, 1 molecular proportion of 4-amino-4'-hydroxy-1:1'-azobenzene-3'-carboxylic acid and 1 molecular proportion of aminobenzene which condensation product has first been dissolved in the form of its sodium salt in 1000 parts of water and rendered alkaline by addition of 100 parts of calcium hydroxide of 20 per cent. strength. Four hours later, the dyestuff which has been formed is separated by means of hydrochloric acid and filtered. The filter residue is dissolved in the form of its sodium salt. The dyestuff which in the free state corresponds to the formula:

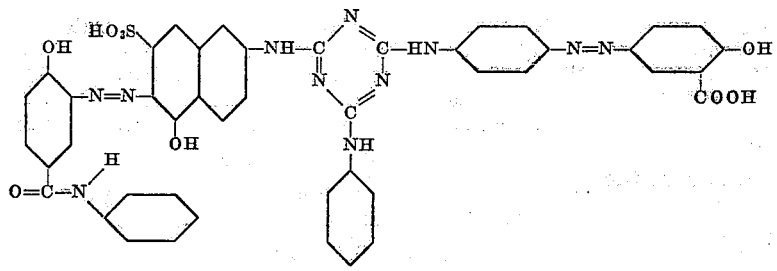

is separated from the solution by means of sodium chloride, filtered and dried.

It is a black powder which dyes cotton in a weakly alkaline bath in red tints. By after-treatment of the dyeing with solutions containing copper salts and basic water-soluble condensation products from formaldehyde and melamine or similar products, tints are obtained which are fast to washing and light.

The replacement in this example of the ternary triazine condensation product used as coupling component by the secondary triazine condensation product from 1 molecular proportion of cyanuric chloride, 1 molecular proportion of 2-amino-5-hydroxynaphthalene-7-sulfonic acid and 1 molecular proportion of 4-amino-4'-hydroxy-1:1'-azobenzene-3'-carboxylic acid leads to a dyestuff with similar properties.

A dyestuff giving similar brown-red shades if used according to the prescriptions of this example, is obtained by using, instead of the ternary triazine condensation product, a coupling component obtained by the action of phosgene on weakly alkaline solutions which contain equivalent weights of 2-amino-5-hydroxynaphthalene-7-sulfonic acid and of the monoazo-dyestuff 4-amino-4'-hydroxy-1: 1'-azobenzene-3'-carboxylic acid.

What we claim is:
1. An azo dyestuff of the formula

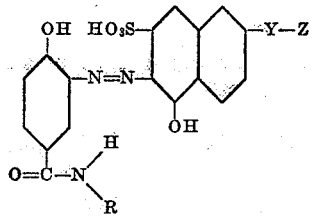

in which R stands for an aromatic radical containing at the most two condensed rings, Y stands for a link consisting of the atom groupings represented by one of the symbols

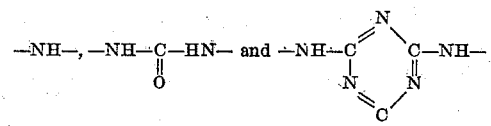

and Z stands for the radical of a monoazo dyestuff.

2. An azo-dyestuff of the formula

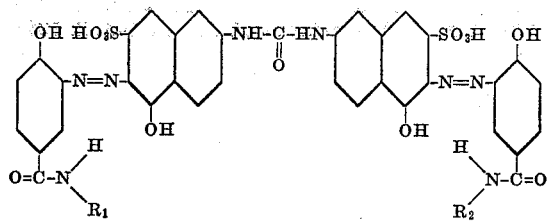

wherein $R_1$ and $R_2$ stand for aromatic radicals each containing at the most two condensed rings.

3. The dyestuff which in its free state corresponds to the formula

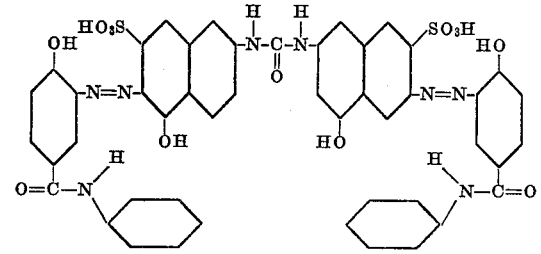

4. The dyestuff which in its free state corresponds to the formula

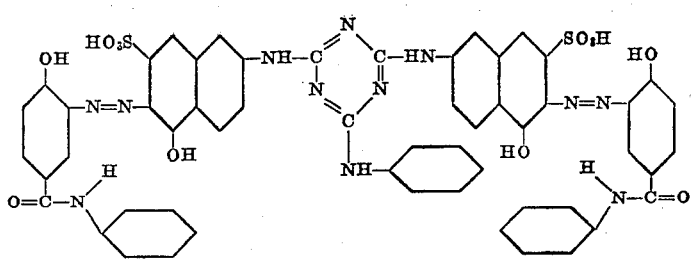

5. The dyestuff which in its free state corresponds to the formula

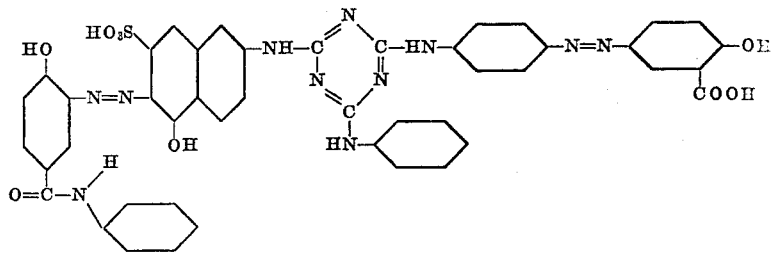

6. An azo-dyestuff of the formula

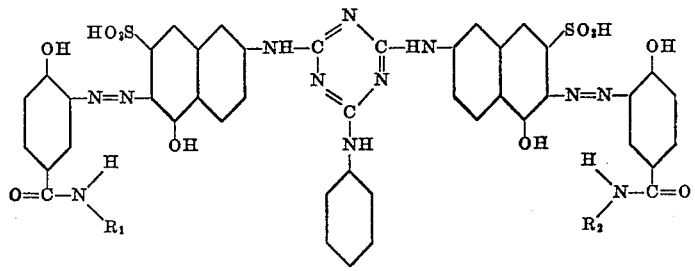

wherein $R_1$ and $R_2$ stand for aromatic radicals each containing at the most two condensed rings.

OTTO KAISER.
ERNST REICH.

REFERENCES CITED

The following references are of record in the file of this patent:

UNITED STATES PATENTS

| Number | Name | Date |
|---|---|---|
| 1,098,388 | Jordan et al. | June 2, 1914 |
| 1,292,385 | Anderwert | Jan. 21, 1919 |
| 1,975,402 | Neelmeier et al. | Oct. 2, 1934 |
| 1,998,507 | Jordan et al. | Apr. 23, 1935 |
| 2,120,814 | Rose | June 14, 1938 |
| 2,128,325 | Rose | Aug. 30, 1938 |
| 2,390,152 | Keller | Dec. 4, 1945 |

FOREIGN PATENTS

| Number | Country | Date |
|---|---|---|
| 488,792 | France | July 22, 1918 |

OTHER REFERENCES

James L. Boyle—Industrial Chemist, Aug. 1939—page 331.